May 22, 1928.  1,670,381

C. B. ROGERS

CRUSHER ROLL

Filed Sept. 23, 1925

Inventor
CHARLES B. ROGERS
By G.W. Earnshaw
Attorney

Patented May 22, 1928.

1,670,381

UNITED STATES PATENT OFFICE.

CHARLES B. ROGERS, OF JOPLIN, MISSOURI.

CRUSHER ROLL.

Application filed September 23, 1925. Serial No. 58,186.

This invention relates to crusher rolls and more particularly to a roll having a hub and a removable crusher shell mounted thereon.

An important object of the invention is to provide a device of the above mentioned character wherein the shell is adapted to be readily detached.

A further object of the invention is to provide novel means for clamping the shell and hub into positive driving engagement, said means being releasable to permit the shell to be removed.

A further object of the invention is to provide a hub and shell, the adjacent faces of which are provided with tapered recesses adapted to receive wedges whereby the hub and shell may be clamped together, novel means being employed for properly clamping the wedges in position.

In the drawings I have shown one embodiment of the invention. In this showing:

Figure 3:
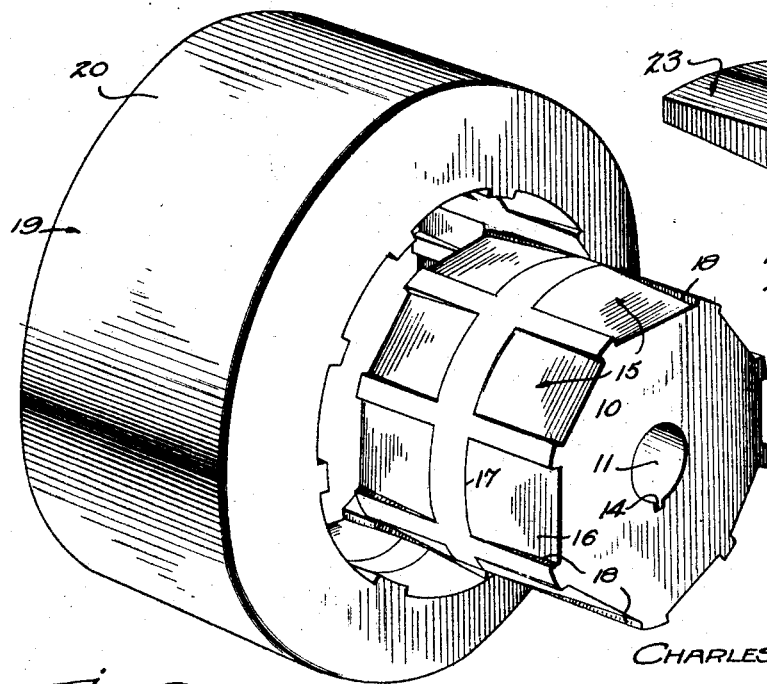
Figure 3 is a detail perspective view of the hub and shell separated.

Referring to the drawings, the numeral 10 designates a hub provided with an axial opening 11 adapted to receive the usual shaft 12 which may be secured thereto by a key 13 arranged in a keyway 14 formed in the hub. The hub is provided on its outer surface with alined pairs of recesses 15 extending from the ends of the hub to points slightly spaced from the center thereof. Each of the recesses 15 is provided with an inclined inner face 16 whereby the recesses increase in depth toward the ends of the hub, and these inclined faces terminate at their inner ends at points spaced from the center of the hub as shown at 17. Each of the recesses is, of course, provided with side walls 18 as shown in Figure 3.

Figure 2:
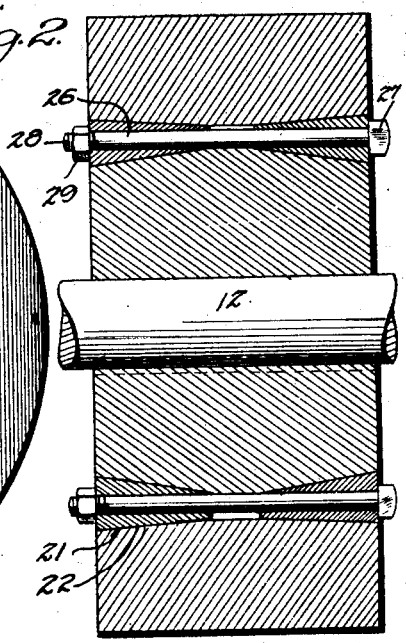
Figure 2 is a vertical longitudinal sectional view through the same.

The numeral 19 designates a crusher shell adapted to surround the hub 10, as shown in Figure 2. The shell is provided with the usual circular outer face 20 as will be obvious. The shell is provided in its inner face with a plurality of alined recesses 21 corresponding in arrangement to the recesses 15 of the hub. Each of the recesses 21 is provided with an inclined inner face 22 whereby the recesses increase in depth toward the ends of the shell as shown in Figure 2. It will be obvious that the faces 16 and 22 are oppositely inclined.

Figure 1:
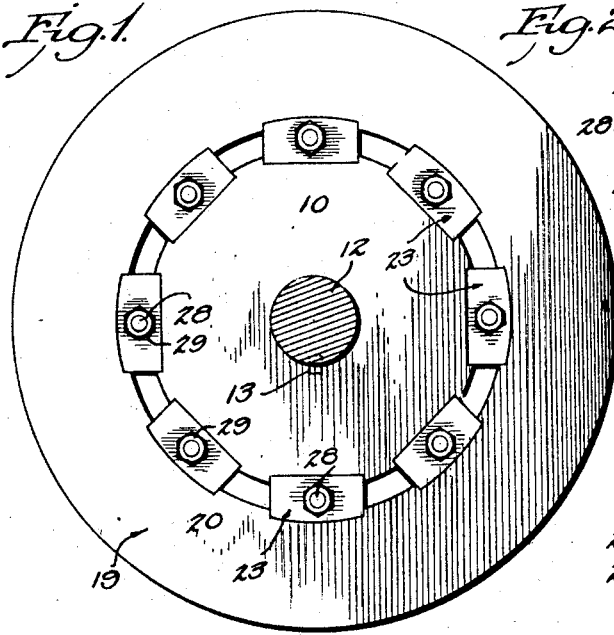
Figure 1 is a side elevation of a roll embodying the invention.
Figure 4:
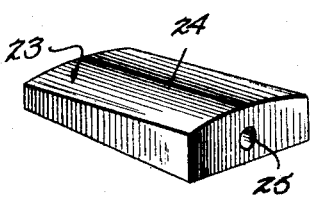
Figure 4 is a similar view of one of the wedges.

Referring in detail to Figure 4, the numeral 23 designates a wedge adapted to be arranged in each of the recesses 15 and its corresponding recess 21. If the faces 22 of the recesses 21 are curved concentrically with the shell, as shown in Figures 1 and 3, the outer face 24 of each wedge will be similarly shaped. Obviously the inner face of each of the wedges is shaped to correspond to the shape of the faces 16. Each of the wedges 23 is adapted to be arranged in one of the recesses of each pair and the wedges are provided with openings 25 arranged substantially parallel to the common axis of the hub and shell. A bolt 26 is adapted to extend through the openings 25 of each oppositely arranged pair of wedges, as shown in Figure 2. Each bolt is provided at one end with an integral head 27 and is threaded as at 28 at its opposite end for reception within a nut 29.

The operation of the device is as follows:

In assembling the device the shell 19 is arranged around the hub 10 and one of the wedges 23 is inserted in each of the recesses 15 and its corresponding recess 21. When all of the wedges have been placed in position, the bolts 26 are inserted through the openings in the wedges and the nuts 29 are applied to the bolts. It will be obvious that the tightening of the nuts 29 will serve to draw the wedges inwardly toward each other whereby the hub and shell will be securely anchored for rotation together. The edges of the wedges 23 are adapted to firmly engage the side walls 18 of the recesses 15 and also the side walls of the recesses 21. It will be obvious that the device may be taken apart when desired by removing the bolts 26 and driving the wedges outwardly.

It is to be understood that the form of my invention herewith shown and described is to be taken as a preferred example of the same and that various changes in the shape, size and arrangement of parts may be resorted to without departing from the spirit of the invention or the scope of the subjoined claim.

I claim:

A device of the character described comprising a hub, a shell surrounding said hub and spaced therefrom, the outer face of said hub and the inner face of said shell being provided at opposite ends with alined pairs of recesses which increase in depth toward the ends of said hub and said shell, each recess in said hub corresponding in position to one of the recesses in said shell, a wedge arranged in each recess in said hub and its corresponding recess in said shell, and single means for drawing the wedges in each alined pair of recesses toward each other.

In testimony whereof I affixed my signature.

CHARLES B. ROGERS.